(12) United States Patent
McBrearty et al.

(10) Patent No.: US 8,001,599 B2
(45) Date of Patent: Aug. 16, 2011

(54) PRECISE WEB SECURITY ALERT

(75) Inventors: Gerald F. McBrearty, Austin, TX (US); Jessica C. Murillo, Round Rock, TX (US); Johnny Meng-Han Shieh, Austin, TX (US); Susann M. Keohane, Austin, TX (US); Shawn P. Mullen, Buda, TX (US)

(73) Assignee: International Business Machines Corporation, Armonk, NY (US)

( * ) Notice: Subject to any disclaimer, the term of this patent is extended or adjusted under 35 U.S.C. 154(b) by 524 days.

(21) Appl. No.: 12/173,080

(22) Filed: Jul. 15, 2008

(65) Prior Publication Data
US 2010/0017878 A1    Jan. 21, 2010

(51) Int. Cl.
*G06F 11/00* (2006.01)
(52) U.S. Cl. ............ 726/22; 726/23; 726/24; 726/25; 713/188
(58) Field of Classification Search ............ 726/22, 726/23, 24, 25; 713/188; 709/224, 229
See application file for complete search history.

(56) References Cited

U.S. PATENT DOCUMENTS

| 7,260,724 | B1 | 8/2007 | Dickinson |
| 2003/0188194 | A1 | 10/2003 | Currie et al. |
| 2007/0112774 | A1* | 5/2007 | Cheshire ............ 707/9 |
| 2008/0060062 | A1 | 3/2008 | Lord |

FOREIGN PATENT DOCUMENTS

WO    W002052764    7/2002

* cited by examiner

*Primary Examiner* — Hosuk Song
*Assistant Examiner* — Baotran N To
(74) *Attorney, Agent, or Firm* — Suiter Swantz pc llo

(57) ABSTRACT

A method for providing an alert when a potentially or likely malicious web site is browsed to by a user. The method maintains web site identification details. If a web site purporting to be a known, previously identified, encountered and utilized web site is browsed to and requests information, the user is alerted to the precise differences between the stored web site historical identity and the identity of the present requester.

1 Claim, 3 Drawing Sheets

PRECISE WEB SECURITY ALERT

TECHNICAL FIELD

The present disclosure generally relates to the field of internet connection security, and more particularly to a method for providing a precise security warning to a user when a malicious web site is suspected or encountered.

BACKGROUND

The present disclosure is directed at a method for precisely warning a user in the event of inadvertent navigation to a web site different than the web site the user had planned to visit. The improved warning may maintain a higher threshold of activation and specific requirements must be met before it is given. Prior art browser security warnings may occur as often as every time a user sends and receives information from a web address. Thus, desensitizing users to security threats. Desensitized users tend to ignore warnings or deactivate browser security features.

More specifically, this disclosure addresses one of the more costly internet attacks involving malicious web sites designed to mimic legitimate web sites. For example, a financial web site which appears facially identical to a legitimate financial web site with the purpose of fraudulently obtaining sensitive information. The difference between a legitimate web site and a malicious web site may be limited to the presence (FIG. 2) or lack of (FIG. 3) a lock symbol in the lower right hand corner of a browser. The user may be directed to the malicious web site mimicking a trusted web site and thereby being duped into disclosing sensitive information.

Many web sites transfer information in a non-secure mode until after the user has entered sensitive account information (for example, a username and password). Once the sensitive information has been entered in the non secure mode, the browser may test a security certificate of the web site to determine if a valid certificate is present before allowing a secure connection. A malicious web site may use this opportunity (while the browser is in the non-secure mode) to extract sensitive information from the user.

The present disclosure is directed at a method to alert the user only to precise, real, and present security risks. This requires more intelligent security sensors and heuristics than is present in the prior art.

SUMMARY

The present application provides a method for providing an alert via a Precise Web Security Alert (PWSA) including, but not limited to maintaining a history of key bits of information for at least one web site browsed by a user by storing a uniform resource locater (URL) for said web site, storing an internet protocol (IP) address for said web site, storing an indicator of data entry to said web site, storing an indicator that communication with said web site occurred over a secure connection, monitoring a current flow of key bits of information between said user and said web site further including: comparing a URL for a currently requested web site with a stored URL for said web site, comparing an IP address for a currently requested web site with a stored IP address for said web site, comparing a current indicator of data entry with a stored indicator of data entry to said web site, comparing a current indicator of a secure connection with a stored indicator that communication with said web site occurred over a secure connection, and alerting said user to a precise difference between said current flow of key bits of information and said history of key bits of information.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings.

Figure 1:
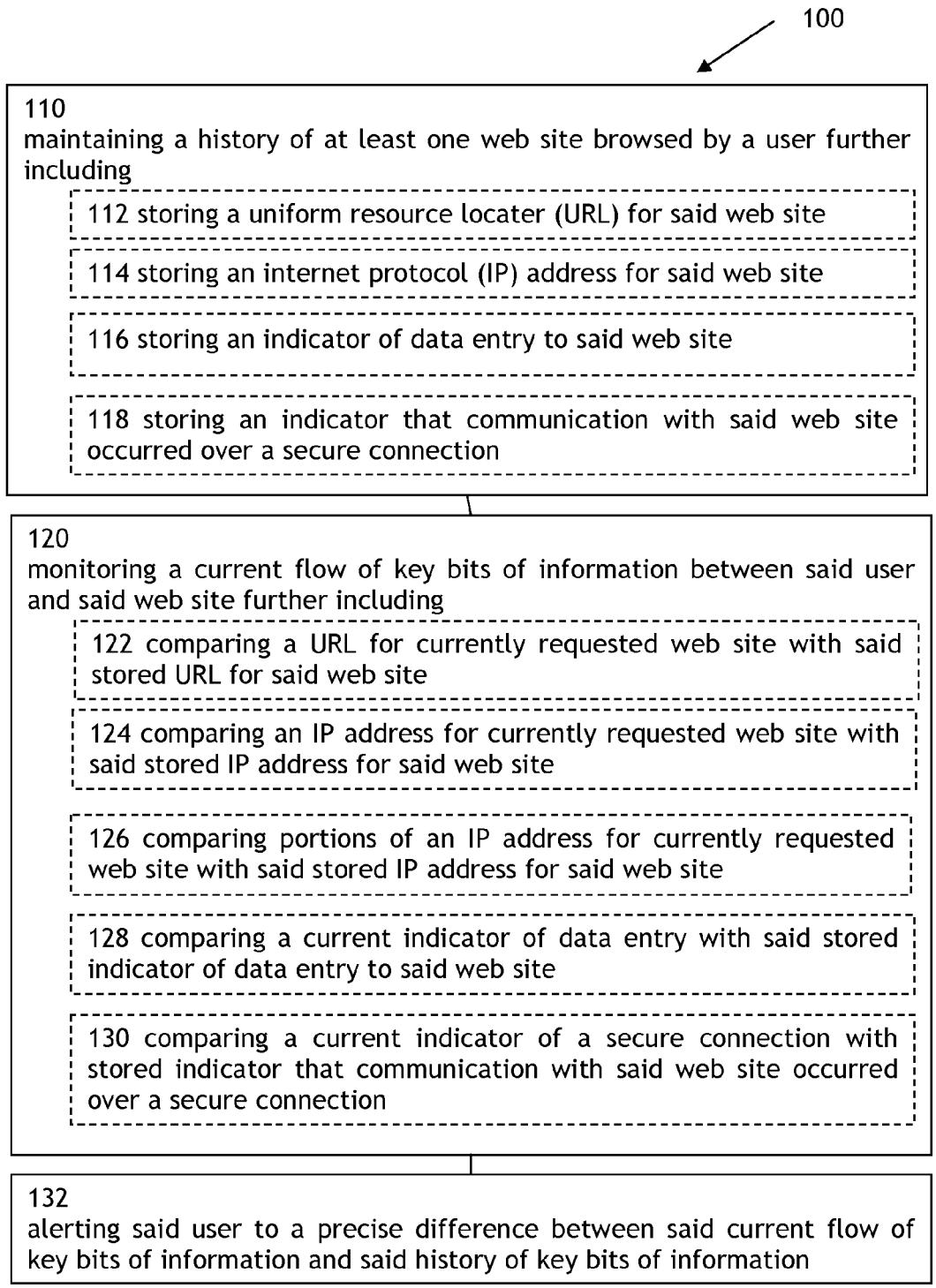
FIG. 1 illustrates a flowchart depicting one embodiment of the method of Precise Web Security Alert.

Referring to FIG. 1, method 100 may maintain a history of key bits of information of at least one web site browsed by a user 110. The key bits of information may contain at least: (1) the uniform resource locater (URL) of the web site 112, (2) the internet protocol (IP) address of the web site 114, (3) an indicator of submission of information to the web site 116, and (4) an indicator that communication with the web site occurred over a secure connection 118. In one embodiment of method 100, the history of key bits of information of web sites browsed by a user 110 may be kept in a browser history file.

In a preferred embodiment, method 100 may include monitoring a current flow of key bits of information between a user and a web site 120. In one embodiment of method 100, monitoring may include comparing data inputs made by a user interacting with a web site. For example, requesting navigation to a web site by typing a URL into the address bar of a web browser, selecting a bookmarked URL or by clicking on a link to a requested web site from a current web site.

In one embodiment, method 100 analysis begins with a comparison of URL-to-IP address from previous visits to a web site with the current URL-to-IP address match. Method 100 monitoring may include comparing a URL for a currently requested web site with a stored URL for said web site 122 and comparing an IP address for a currently requested web site with a stored IP address for said web site 124. The currently requested IP address may not match exactly but may match a significant part of the higher range of the stored IP address indicating the same subnet (the same general geographical location). If the URL for the currently requested web site matches the exact IP address or significantly matches the subnet, method 100 may determine with a high degree of certainty the requested web site is legitimate. However, if the URL for the currently requested web site does not match the exact or subnet IP address, the method 100 may compare portions of an IP address for currently requested web site with the stored IP address for said web site 126. A portion comparison may consist of a bit by bit comparison of an IP address for currently requested web site with the stored IP address for said web site or a byte by byte comparison of an IP address for currently requested web site with the stored IP address for said web site. The method 100 will continue the analysis of web site legitimacy with a comparison of a current indicator of data entry with a stored indicator of data entry to said web site 128. If a user does not enter data to a web site there is no security threat however, if a user begins to transmit data to a suspect web site the indicator of data entry 128 will become positive and analyzed against the stored indicator 116 to determine web site legitimacy. If both stored and current indicators of data entry are positive, method 100 may continue to a final analysis of comparing a current indicator of a secure connection with a stored indicator that communication with said web site occurred over a secure connection 130.

Figure 2:
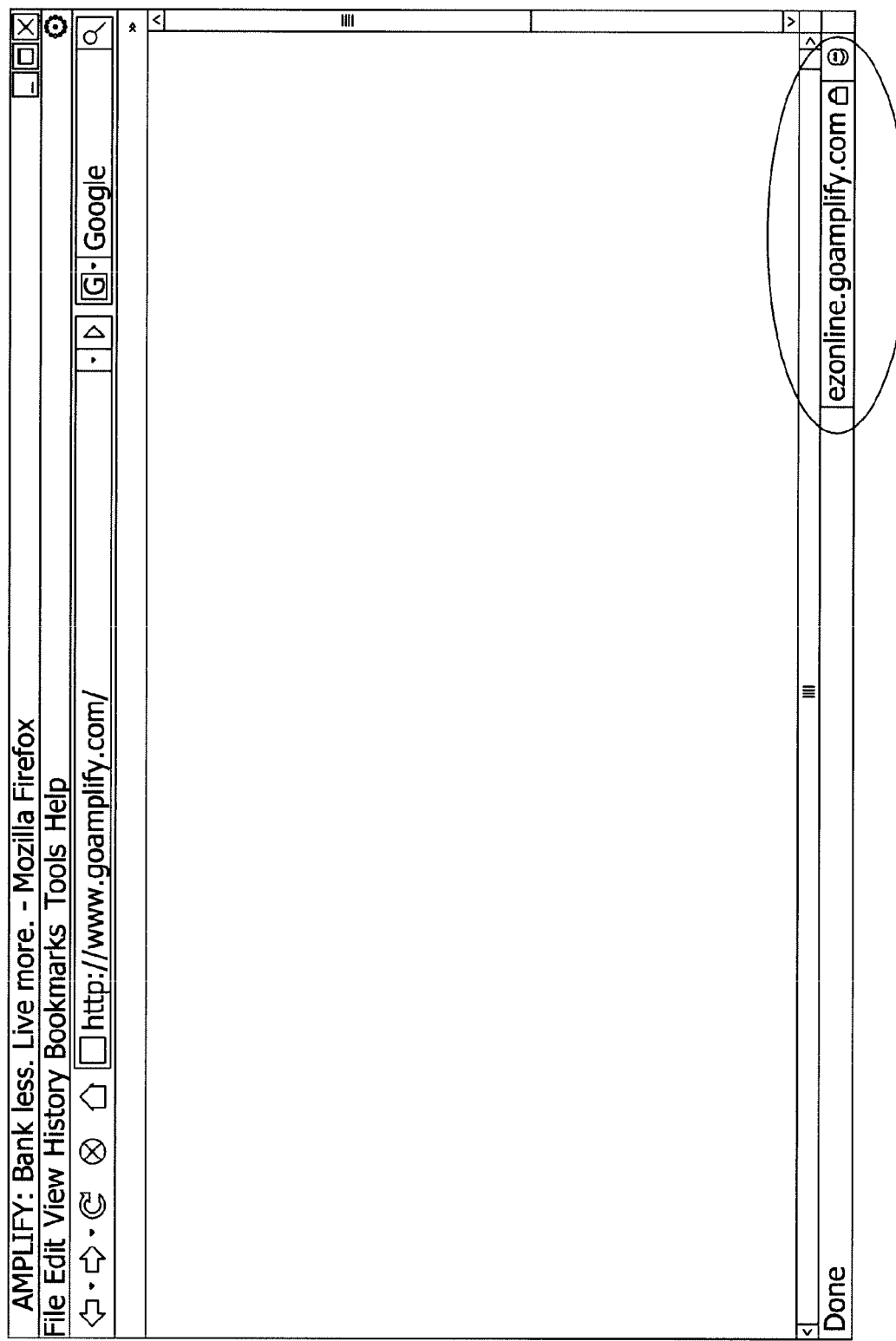
FIG. 2 illustrates an example of a web site in a secure mode having passed the requirements of the browser displaying the lock symbol in the lower right corner of the window.
Figure 3:
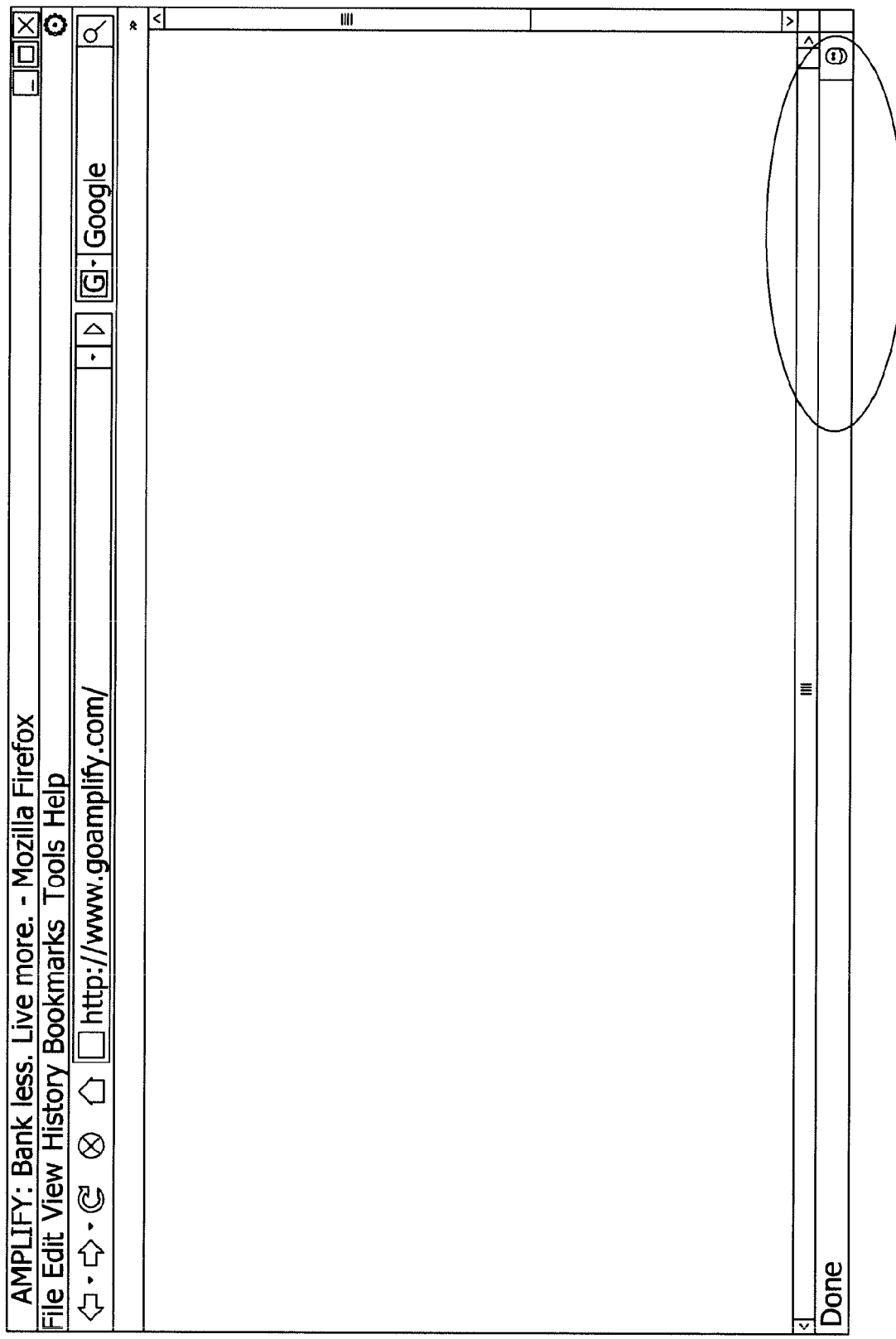
FIG. 3 illustrates an example of a web site in a non-secure mode having failed the requirements of the browser lacking the lock symbol in the lower right corner of the window.

This final analysis 130 preferably compares the history of a secure connection with the requested web site against the current presentation of a certificate of negotiation of a secure connection. Prior art browser security connections are illustrated in FIG. 2 and FIG. 3. A user may navigate to a web site anticipating a secure connection where a user's browser may interrogate the purported web site to determine the validity of the certificate of negotiation of a secure connection. If the certificate is valid in accordance with a standard set by the browser utilized, the browser may allow a secure connection whereas if the certificate is invalid, the browser may require user input to continue to the requested web site. After a secure connection has been established, the only indicator of a secure connection (FIG. 2) may be a small lock symbol in the lower right hand corner of the browser window or the URL prefix changing from "http:" to "https:". A naive user may not notice these indications (in a non-secure mode (FIG. 3)). In the present invention, if the stored indicator that communication occurred over a secure connection 118 is positive and the purported same requested web site offers a certificate which is valid, no warning will be given (e.g., a stock trading web site where previous visits have been secure and the present interrogation produces a valid certificate). However, if the stored indicator that communication occurred over a secure connection 118 is positive and the purported same requested web site offers an invalid certificate, the method may alert the user to a possible security risk associated with the requested web site 132. For example, a banking web site browsed to in secure mode previously versus a current interrogation of a banking web site offering an invalid certificate. The invalidity of an offered security certificate may trigger a precise alert.

In a preferred embodiment, the method may alert the user precisely to any differences from previous visits. This allows the user to make a better decision on whether to continue or discontinue and investigate further.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A method for providing an alert, performed by a processor executing non-transitory computer usable program code, comprising:

maintaining, by a device, a history of key bits of information of at least one web site browsed by a user further including:
storing a uniform resource locater (URL) for said web site;
storing an internet protocol (IP) address for said web site;
storing an indicator of data entry to said web site;
storing an indicator that communication with said web site occurred over a secure connection;
monitoring a current flow of key bits of information between said user and said web site further including:
comparing a URL for currently requested web site with said stored URL for said web site;
comparing an IP address for currently requested web site with said stored IP address for said web site;
comparing portions of an IP address for currently requested web site with said stored IP address for said web site;
comparing a current indicator of data entry with said stored indicator of data entry to said web site;
comparing a current indicator of a secure connection with said stored indicator that communication with said web site occurred over a secure connection; and
alerting said user to a precise difference between said current flow of key bits of information and said history of key bits of information.

* * * * *